United States Patent [19]

Beard

[11] 4,436,632
[45] Mar. 13, 1984

[54] CLARIFIER SKIMMER

[76] Inventor: Harold J. Beard, P.O. Box 3838, Baton Rouge, La. 70821

[21] Appl. No.: 494,641

[22] Filed: May 16, 1983

Related U.S. Application Data

[63] Continuation-in-part of Ser. No. 370,802, Apr. 22, 1982, Pat. No. 4,383,922, which is a continuation-in-part of Ser. No. 316,112, Oct. 29, 1981, Pat. No. 4,362,625.

[51] Int. Cl.³ .............................................. B01D 21/00
[52] U.S. Cl. ..................................... 210/776; 210/128; 210/540
[58] Field of Search .............. 210/776, 119, 124, 128, 210/221.2, 523, 525, 538, 540

[56] References Cited

U.S. PATENT DOCUMENTS

| | | | |
|---|---|---|---|
| 801,330 | 10/1905 | Moore | 210/540 |
| 2,670,848 | 3/1954 | van Houten et al. | 210/540 X |
| 3,186,550 | 6/1965 | Beduhn | 210/540 X |
| 3,817,383 | 6/1974 | Michel et al. | 210/538 X |
| 3,846,292 | 11/1974 | LeCompte, Jr. | 210/629 |
| 4,049,553 | 9/1977 | Stebbins et al. | 210/221.2 X |
| 4,225,434 | 9/1980 | Ernst et al. | 210/128 X |
| 4,303,516 | 12/1981 | Stengel et al. | 210/195.4 |
| 4,362,625 | 12/1982 | Beard | 210/170 X |
| 4,372,854 | 2/1983 | Szereday | 210/538 X |
| 4,383,922 | 5/1983 | Beard | 210/170 X |

FOREIGN PATENT DOCUMENTS 1589370 5/1981 United Kingdom ................ 210/540

Primary Examiner—Robert H. Spitzer
Attorney, Agent, or Firm—Roy & Kiesel

[57] ABSTRACT

In an oxidation ditch process for clarifying a waste water stream employing a clarifier boat, a novel skimmer assembly is disclosed having a buoyant closing assembly to control the amount of surface fluid containing the bulk of the oils, greases, etc. in the waste water being removed from the clarifier.

2 Claims, 4 Drawing Figures

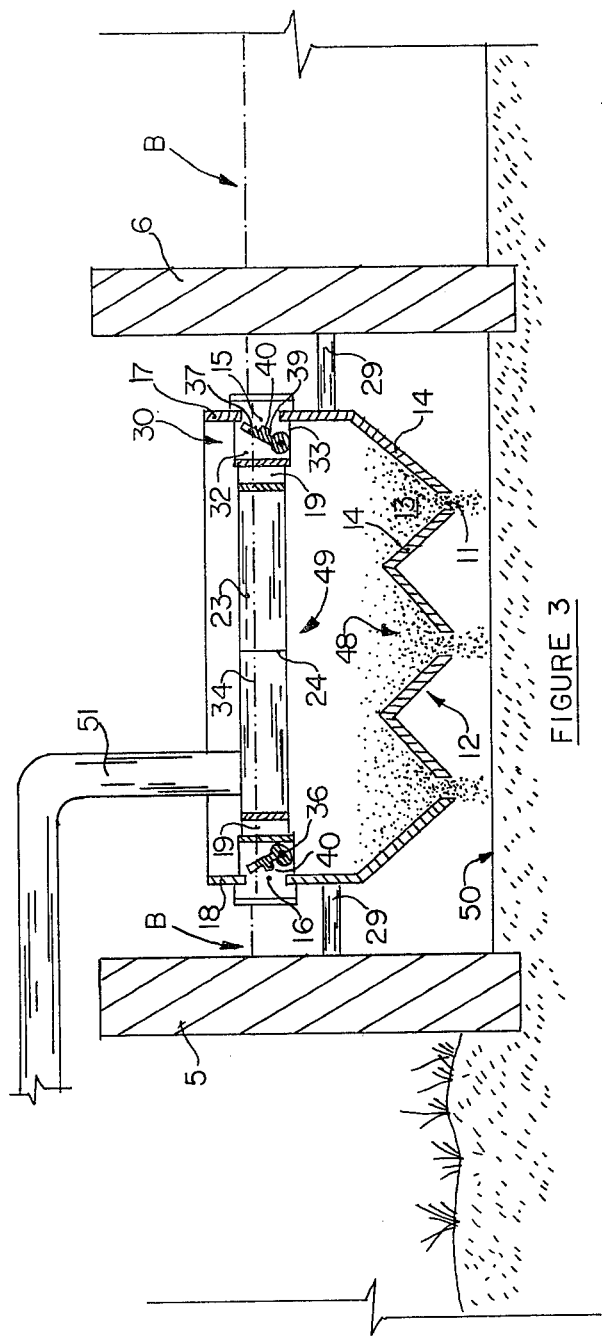
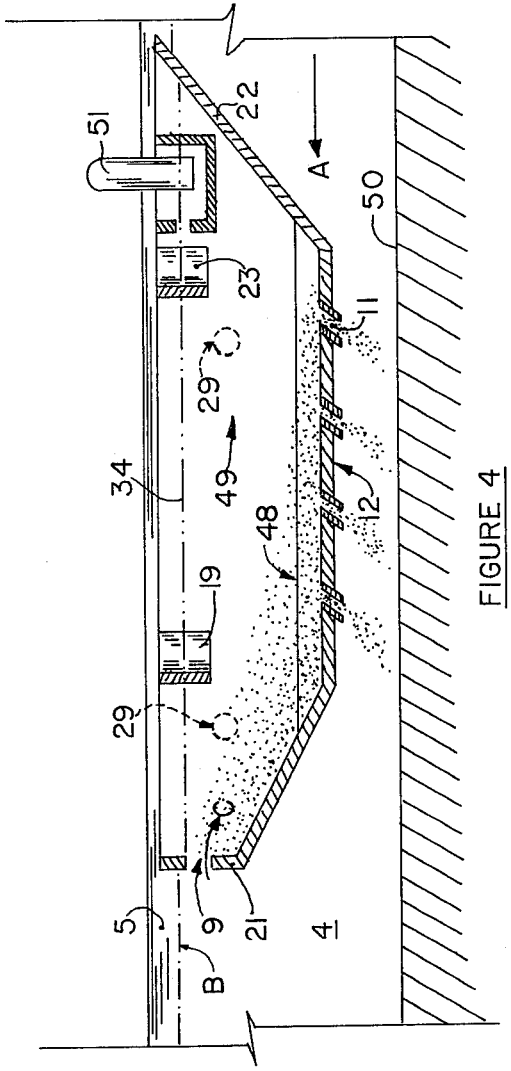

CLARIFIER SKIMMER

RELATED APPLICATIONS

This is a continuation-in-part of application Ser. No. 370,802, filed Apr. 22, 1982, now U.S. Pat. No. 4,383,922, issued May 17, 1983, and entitled "Waste Water Clarifier", which patent is a continuation-in-part of application Ser. No. 316,112, filed Oct. 29, 1981, now U.S. Pat. 4,362,625, issued Dec. 7, 1982, and entitled "Waste Water Clarifier", both by the inventor herein, and which specific mention is made thereof to obtain the benefit of their filing dates.

BACKGROUND OF THE INVENTION

1. Field of the Invention.

This invention relates to a system for treating waste water and, more particularly, to an oil and grease skimmer employed in an oxidation ditch clarifier.

2. Prior Art.

To remove impurities, such as sugars and other carbohydrates and proteins and other forms of nitrogen, as well as other types of pollutants from domestic sewage, industrial waste water or similar waste water streams, the use of an orbital or oxidation ditch system can be employed.

In its general usage, an orbital waste water treatment system includes an elongated tank having two sidewalls and at least one partition wall mounted vertically in the tank substantially parallel to the two sidewalls and spaced apart from the ends of the tank to form an endless, circuitous channel or oxidation ditch to contain a portion of the waste water stream. In a conventional oxidation ditch system, the waste water is constantly circuitously flowed in the ditch while at the same time aerated to provide oxygen for micro-organisms to decompose most of the pollutants. An example of such a system can be seen in U. S. Pat. No. 3,846,292, wherein a portion of the waste water put in the ditch is removed after aeration and then transferred to a conventional clarifier where heavier solid particles are separated out. Because of high construction costs, a system employing the clarifier in the ditch was developed; an example of which is seen in U.S. Pat. No. 4,303,516.

However, because of turbulence in the clarifier used as well as the cost of ditch and clarifier construction due to the use of settlement separation processes, even these systems were not as efficient as desired. This led to the development of improved clarifier designs as shown in applicant's U.S. Pat. Nos. 362,625 and 4,383,922, identified above. This invention relates to the improved process of treating waste water streams made possible by these improved clarifier designs and, more particularly, improved skimmers to remove oils, greases and other floating particles from the clarifier even when the level of fluids in the oxidation ditch and clarifier change.

SUMMARY OF THE INVENTION

Therefore, it is an object of this invention to provide an efficient process for treating waste water streams.

Another object of this invention is to provide a process for treating waste water streams at faster rates and less expensively.

Still another object of this invention is to provide skimmer assemblies which efficiently remove oils, greases and other floating particles from the surface of the clarifier fluid, even when the fluid level in the oxidation ditch and the clarifier changes.

A further object of this invention is to provide skimmer assemblies to maintain a constant flow rate of surface fluids flowing out of the clarifier.

A still further object of this invention is to provide a skimmer apparatus which utilizes only the dynamics of fluid flow in the clarifier to operate.

Other objects and advantages of this invention shall become apparent from the ensuing descriptions of the invention.

Accordingly, an apparatus for use in an oxidation ditch clarifier having openings in its sidewalls positioned to allow flow of fluids from the clarifier to the ditch is disclosed comprising a valve means having a buoyant gate positioned in the clarifier adjacent the clarifier and floating in the clarifier fluid.

BRIEF DESCRIPTION OF THE DRAWINGS

FIG. 3 is a cross-sectional view taken along lines I—I of FIG. 1, illustrating a preferred embodiment of the skimmer.

FIG. 4 is a cross-sectional view taken along lines II—II of FIG. 1.

PREFERRED EMBODIMENTS OF THE INVENTION

Figure 1:
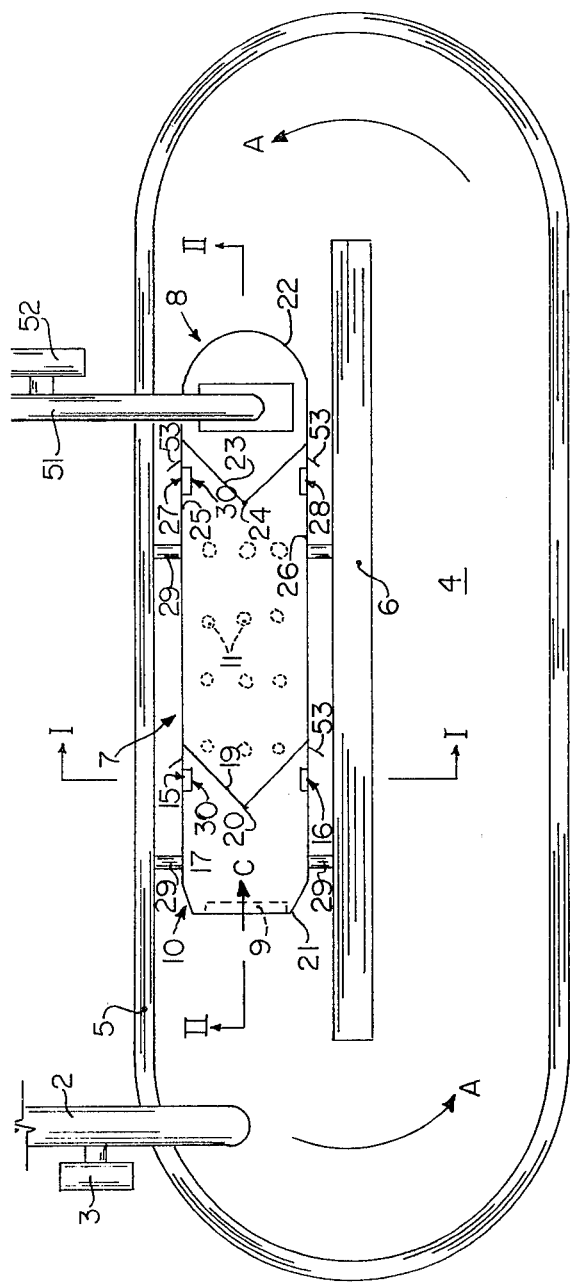
FIG. 1 is a schematic top view of a preferred oxidation ditch-clarifier assembly utilizing the skimmer of this invention.

Referring now to FIG. 1, waste water in stream 1 is removed through conduit 2 by pumping devices 3 and dumped into oxidation ditch 4 formed by concrete walls 5 and 6, as shown. The diverted portion of the waste water stream is circulated about ditch 4 in the direction of arrow A. If the velocity of the waste water entering ditch 4 is not sufficient to create the necessary waste water flow rate in ditch 4, various conventional means can be used to achieve the desired flow rate.

A clarifier 7, such as described in U.S. Pat. Nos. 4,362,625 and 4,383,922, is positioned in ditch 4 whereby its front section 8 (front side sections and bow) faces into the direction of arrow A. As is shown more clearly in FIGS. 2 and 3, clarifier 7 is provided with an opening 9 located in the rear section 10 (rear side sections and stern), preferably the stern, and more preferably completely below the level B of the waste water in ditch 4. Clarifier 7 is also provided with a series of rows of ports 11 located in its bottom 12. As seen in FIG. 3, a preferred embodiment of clarifier 7 is the utilization of parallel troughs 13 formed by sloping sidewalls 14 wherein ports 11 are positioned at the bottom of troughs 13.

To facilitate the removal of oils, greases and similar material which accumulate on the surface of the fluid in clarifier 7, rear side ports 15 and 16 are positioned in rear sidewalls 17 and 18, respectively, to allow the surface fluids to flow back into oxidation ditch 4. In a preferred embodiment, a "V" shaped rear baffle 19 extends between sidewalls 17 and 18 forward of ports 15 and 16 with its apex 20 facing stern 21. In this embodiment, baffle 19 extends above the fluid surface to a position below the surface to allow the deeper waste water to continue to flow toward the bow 22. Thus, the oils, greases, etc. are directed toward ports 15 and 16 and out of clarifier 7. In a more preferred embodiment, a front baffle 23 is provided having its apex 24 directed toward stern 21 and extending between bow sidewalls 25 and 26, as shown. Thus, oils, greases, etc., which do not rise to the surface until phase separation, as explained below, is almost complete, are directed toward bow side ports 27 and 28.

Figure 2:
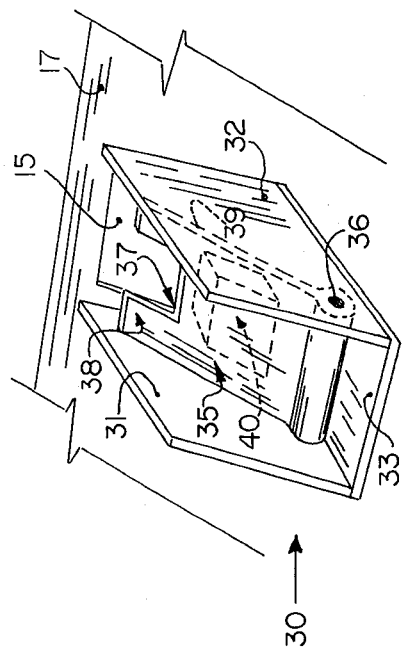
FIG. 2 is a detailed view of a preferred embodiment of the skimmer of this invention.

Clarifier 7 is rigidly attached to walls 5 and 6 by support members 29. To maintain a constant fluid flow rate out of clarifier 7 during changes in fluid level in ditch 4 and clarifier 7, skimmer assemblies 30 are positioned before each side port. FIGS. 2 and 3 illustrate one preferred embodiment of a skimmer assembly which can be used. In this embodiment, assembly 30 comprises parallel side plates 31 and 32 connected together at their lower end by floor plate 33 wherein side plates 31 and 32 extend above and below side port 15 and clarifier fluid level 34. Extending between side plates 31 and 32 is gate 35, which is pivotly attached by pin 36. Gate 35 is provided with a slot 37 formed by cutting a wide notch in gate upper end 38. Attached to the back side 39 of gate 35 is a flotation device 40 positioned below fluid level 34 and having sufficient buoyancy force to maintain gate end 38 the same distance above fluid level 34 even when level 34 is changing. It is preferred that there be as little leakage between side walls 31 and gate 35 as possible, yet allow gate 35 to freely pivot on pin 36. Thus, the rate of fluid flowing through port 15 remains relatively constant even with changes in fluid levels.

The movement of the waste water through opening 9 will cause the direction of flow C in clarifier 7 to be directed back toward arrow A. It has been found that this change in flow direction results in less turbulence in clarifier 7, and, thus, enabling a quicker separation of the waste water into a sludge phase 48 and a clarified phase 49.

While this process could be carried out in batch fashion by closing opening 9 after the desired amount of waste water has entered clarifier 7, it is preferred to operate the process in a continuous fashion. This is accomplished by waste water between bottom 12 and ditch floor 50 flowing at a faster rate than the flow rate in other portions of ditch 4. This faster rate creates a head differential between the liquids in the clarifier and in the ditch which results in drawing the waste water, particularly the sludge phase, out of clarifier 7 through ports 11. The flow rate through ports 11 is preferably controlled by varying the total cross-sectional area of ports 11 through which fluids can pass or by varying the head differential between the level of the waste water in the clarifier and the level B of the waste water in the ditch. In a preferred embodiment, the head differential is preferably controlled by raising or lowering clarifer 7 in ditch 4 in order to vary the cross-sectional area ratio of the waste water stream at clarifier 7 to a position in front of clarifier 7. The increased displacement of clarifier 7 in the ditch results in a greater flow rate past ports 11 and increases the flow rate of the sludge phase through ports 11.

As the waste water flows through opening 9 into clarifier 7, its velocity begins to decrease allowing heavier particles to drift toward bottom 12. This results in a liquid or sludge phase containing a higher percentage of the undesired particles located near the clarifier bottom, which are then drawn out through ports 11. It has been found that a preferred maximum flow rate inside clarifier 7 is up to 0.1 ft/sec. which, with proper sizing and positioning of ports 11, can achieve the preferred volume amounts ratio of sludge phase to clarified phase removed of 1:1 to 2:1. The lighter particles (oils, greases, etc.) float to the surface of the fluid and are directed toward the ports 15 or 16 by the action of the flow stream against the baffles directing these floating particles. All of this has been accomplished by the natural dynamics of the clarifier design without the use of motorized scrappers and other devices that must move across the surface of the clarifier. Even the preferred embodiment of the skimmer does not require any power driven equipment or other devices that create extra turbulence in the clarifier fluids.

As a final step, the clarified phase 49 is removed through conduit 51 by conventional pumping, gravity or syphon means 52 and returned to stream 1.

In another preferred embodiment, stream deflector plates 53 are angularly attached to the outside surface of sidewalls 17 and 18 to direct the flow of the waste water around the side ports 15 and 16 to restrict flow of the waste water into the clarifier from these ports.

In addition, gate 35, being floatable, will rise during turbulence in the oxidation ditch 4 to restrict flow back into the clarifier 7, thus preventing contamination of the clarified phase.

There are, of course, many obvious embodiments not specifically described, but which are intended to be included within the scope of this invention as defined by the following claims.

What I claim is:

1. A process for clarifying a waste water stream comprising:
   (a) circuitously flowing said waste water stream in an oxidation ditch having an elongated clarifier positioned therein with its front section heading into the flow of said waste water stream and positioned to decrease the cross-sectional area of said waste water stream in said oxidation ditch where said clarifier is located,
   (b) diverting a portion of said waste water stream into said clarifier,
   (c) causing said portion to flow at a rate and distance sufficient to generate said portion into a clarified phase and a sludge phase,
   (d) causing a surface section of said portion to strike a baffle means extending between the sides of said clarifier wherein said clarifier has ports in its sidewalls to allow surface fluids to flow out of said clarifier, said baffle means being positioned to divert said surface section toward said ports,
   (e) removing said sludge phase from said clarifier, and
   (f) removing said clarified phase from said clarifier.

2. A process according to claim 1 wherein the flow rate of said surface section flowing through said ports is constant.

* * * * *